Figure 1:
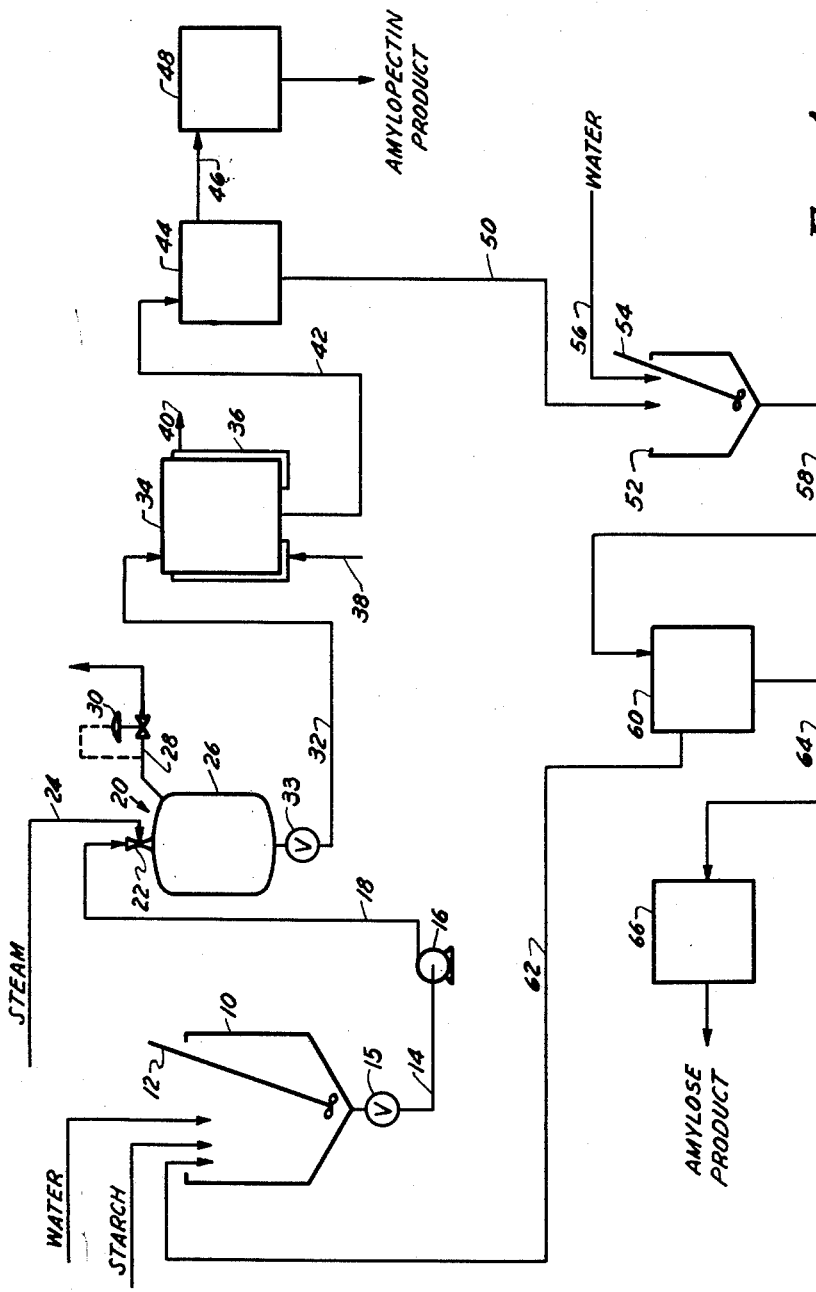

Dec. 4, 1962     O. R. ETHERIDGE ET AL     3,067,067
STARCH FRACTIONATION

Filed Jan. 13, 1960     2 Sheets-Sheet 1

INVENTORS.
O. R. ETHERIDGE, D. A. LIPPINCOTT
J. W. McDONALD, J. A. WAGONER

BY Charles J. Myerson
Atty.

INVENTORS
O.R. ETHERIDGE, D.A. LIPPINCOTT
J.W. McDONALD, J.A. WAGONER

United States Patent Office 3,067,067
Patented Dec. 4, 1962

3,067,067
STARCH FRACTIONATION
Oliver R. Etheridge, Decatur, John A. Wagoner, Mount Zion, and John W. McDonald and Dorothy Ann Lippincott, Decatur, Ill., assignors to A. E. Staley Manufacturing Company, Decatur, Ill., a corporation of Delaware
Filed Jan. 13, 1960, Ser. No. 2,160
14 Claims. (Cl. 127—71)

This invention relates to the separation of the amylaceous components of starch, that is, to the separation of amylose and amylopectin.

Ordinary starch is known to consist of two types of polymers of glucose, the linear polymer called amylose (sometimes referred to as the "A-fraction"), and the branched-chain polymer called amylopectin (sometimes referred to as the "B-fraction"). The relative content of amylose and amylopectin varies with the source of the starch. For example, depending somewhat on the analytical technique used, it has been estimated that tapioca contains about 17–21% amylose; potato starch, 22–25%; corn starch, 22–30%, and so on. The amylose molecule is considered to be a long, linear chain of anhydroglucose units. The amylopectin molecule, on the other hand, is considered to be a larger, complex branched chain of tree-like structure with many of the branches themselves having branches and so on.

The two fractions have substantially different properties. According to Kerr, Chemistry and Industry of Starch, Academic Press (1950), the amylose molecule is of low molecular weight (a few hundred anhydroglucose units with only one non-reducing end group per molecule). On the other hand, amylopectin is of high molecular weight (more than 1000 anhydroglucose units with one non-reducing end group for each 20 to 30 glucose residues). Amylose has a high intrinsic viscosity and a low solution stability in water at ordinary concentrations while amylopectin has a fairly high solution stability, but about the same intrinsic viscosity.

The interest in the separation of starch fractions has a long history as is evident from the discussion and references cited in the Kerr volume, pp. 181 ff. and from Schoch's review article in Advance in Carbohydrate Chemistry 1, 247–277 (1945).

Initially, as Schoch points out, attempts were made to fractionate starch from water dispersions and the starch-water system was studied over many years. Representative of the various studies made are these references: Alsberg et al., Proceedings of the Society for Experimental Biology and Medicine 23, 728–30 (1926); Beijerinck, Proceedings of the Royal Academy, Amsterdam, 18, 305–9 (1915); Reychler, Bull. Soc. Chim. 29, 311–16 (1921). However, neither these nor the many other similar studies reported in the literature from about 1900 on yielded a useful method for fractionating starch. Schoch indicates in his review (1945) that this approach has been unsuccessful for these reasons: "Numerous attempts have been made to effect a fractionation by this means, usually on starch solubilized by hydrolytic action. Several investigators have reported the slow deposition of crystalline aggregates from autoclaved starch sols. At best, such fractionations are superficial since the protective colloid effect of the B-fraction impedes precipitation of the A-fraction. Also, considerable co-precipitation occurs."

Relatively recently, several different approaches have been taken with the view of producing the individual fractions. One approach has been the genetic development of waxy maize whose starch consists essentially of amylopectin. Currently, there is a major program under way to breed a variety of corn whose starch is high in amylose. Further, over the last twenty years, a substantial number of patents have issued on chemical methods for the separation of the two fractions.

None of the methods used to produce the separate starch fractions has proved really successful in an economic sense and each has its drawbacks. The amylopectin derived from waxy maize corn is expensive because of the care require in growing and processing this hybrid variety. The genetic program to breed corn whose starch consists essentially of amylose has not succeeded up to now, although it is understood that a mutant has been found that has of the order of twice the amylose content of normal corn. On the other hand, the chemical methods of separation are based on the formation of a chemical complex of the fractions, particularly of the amylose, or on a fractional salting-out process which may also employ a complexing agent. For example, in one method, an alkaline earth hydroxide complex is used; in another, an alkyl alcohol complex (pentanol or butanol for example) is produced; and in another, solutions of certain inorganic sulfates are used in a kind of fractional crystallization. All of these chemical methods are unsatisfactory because of the problems in recovering, separating or disposing of the reagents used.

That none of the methods has been entirely satisfactory is an indication of the difficulty in finding an economically competitive process that produces both amylose and amylopectin from the common natural starches. We have discovered an economical method of effecting the separation to produce high purity amylose and amylopectin in good yield without the addition of any reagent other than water.

The general object of our invention is to provide an improved method of separating the fractions of starch from the naturally occurring mixture in starch.

Still another object is to provide a method for producing amylose substantially free of amylopectin.

Still another object is to provide a method for producing amylopectin substantially free of amylose.

A further object is to provide an economically practical method of separating the fractions of starch from the ordinary varieties now readily available in large quantities, particularly from ordinary corn starch.

Other objects will be, in part, apparent and, in part, pointed out hereafter.

In this application the word "starch" is used in a generic sense to refer to starch containing a substantial proportion of amylose. As illustrated hereafter, any variety of starch or mixture of starches may be used, including corn, rice, wheat, tapioca, sago, sorghum, potato, etc., although there is some variation in the operation of the process with some of these starch varieites. We include starch that has been pregelatinized in the usual way and that has been roll- or spray-dried, i.e., the starch often referred to as cold-water-swelling or cold-water-soluble. In this process, we can paste starch in the usual way be heating under the boiling point of the starch slurry and then carry the paste, without cooling, through the process. Since starch derived from waxy maize is essentially free of amylose, it is, of course, not useful in the present process. Slightly modified or slightly dextrinized starch, or starch that has been reacted to form a derivative with a minor amount of substitution whether before or after gelatinization, may be substituted for native starch, so long as these are substantially equivalent to native starch in pasting properties. However, such starch products are more expensive and, as the extent of reaction of the starch is increased, the starch fractions are of lower purity or the yield on separation is reduced or both.

Because cold-water-swelling or pregelatinized starch offers no advantage in this process (and is, in fact, disadvantageous when a high molecular weight product is desired), we prefer to start with granular native starch and carry it directly through the process. In addition, slurries of granular native starch are more easily handled. Most important, however, in using granular native starch is the fact that the molecular weight of the fractions will be at their maximum since the starch has not previously been treated in any way that might lower the molecular weight.

Stated briefly, the objects of this invention are attained by the following sequence of steps: (1) forming a fluid solution by heating a mixture consisting essentially of starch and water above about 250° F., but not high enough to degrade the starch substantially; (2) cooling the fluid solution below the atmospheric boiling point, the concentration of the cooled solution preferably being more than about 2.5% starch dry substance by weight; (3) keeping the cooled fluid solution above about 120° F. for a period to stabilize it and to precipitate an amylose-rich solid therefrom; and (4) separating a solid fraction enriched in amylose and a fluid fraction enriched in amylopectin. The viscosity of the solution during cooling below the atmospheric boiling point is kept below about 1500 centipoises. Our results indicate that, in order to stabilize the solution and precipitate and grow the amylose-rich particles, step (3) requires at least about eight hours. In addition, we have discovered that an effective separation is greatly facilitated when the amylose-rich particles have grown until at least 50% by weight are in excess of 20 microns in diameter.

Figure 2:
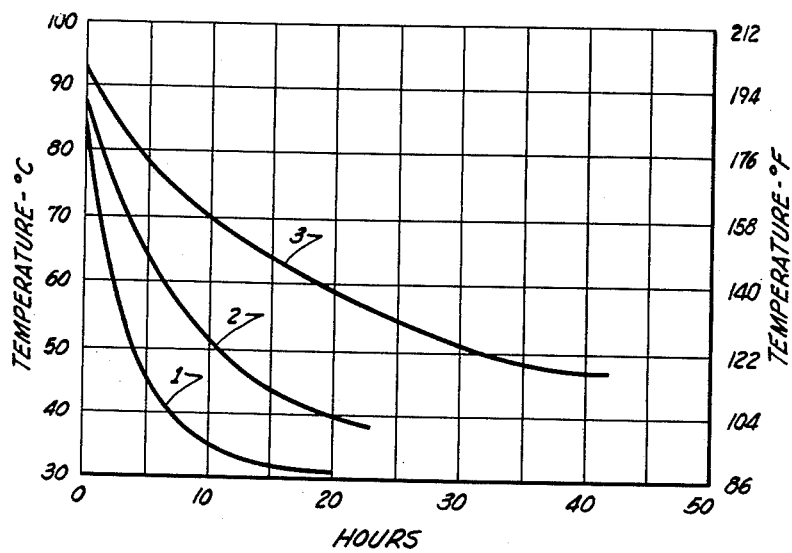

The accompanying drawings illustrate several aspects of our invention. In the drawings: FIG. 1 is a flow diagram of the method of this invention; and FIG. 2 is a graph illustrating the cooling rates used in several of the examples described hereinafter.

We have discovered that by following the method outlined in the penultimate paragraph, we are able to prepare a noncongealing starch solution and to precipitate amylose from it as a solid phase that is relatively easily separated from the solution. These results are attained through a carefully controlled cycle of heating and cooling starch and water alone. As conducive to a clear understanding of the invention, it is desirable at this point to describe some of the changes in the starch-water mixture during the process and to contrast these with the known behavior of starch pastes.

In the process, the starch in water is initially heated above about 250° F. As the temperature of the starch-and-water mixture is increased, initially there is a very great increase in viscosity so that the starch paste is barely fluid. This barely fluid condition persists even above the boiling point until the temperature has been increased to a particular value that is determined by the type of starch, the rate of heating, and so on. Then, quite abruptly, at a temperature above about 250° F., there is a change to a fluid, mobile and usually quite clear liquid which we have termed a "solution." Unless this transformation takes place, we have observed, no separation of the amylose is possible and the solution is likely to congeal on cooling. It should be borne in mind that the formation of the solution, as described above, takes place at temperatures well above the usual pasting temperature of starch. The dispersion of starch which we call a solution may or may not be a true solution. We apply that name to contrast with the usual starch paste which is prepared by heating an aqueous suspension of starch in water below the boiling point at atmospheric pressure.

When the solution is cooled in accordance with this invention, it is stabilized and it does not congeal even when ultimately cooled to room temperature. The viscosity characteristics are stabilized to such an extent that the fluid solution may be repeatedly heated and cooled, below its atmospheric boiling point, its viscosity being always essentially the same at any particular temperature, and no starch gel is formed even though this might be expected of the type of starch employed. If, on the other hand, the fluid solution is not held above about 120° F. for the necessary period, the solution, in common with the usual starch pastes of the particular variety of starch, suffers "setback" on cooling, i.e., forms a gel. The congealing is evidenced initially by increases in the viscosity measurement; with the passage of time, the apparent viscosity increases and the solution becomes more and more cloudy. The material takes on a lumpy consistency, then becomes salve-like and ultimately may become rigid. This process is not reversible, i.e., the gel cannot be rendered fluid by reheating below about 250° F. Once gel formation has begun, it is not possible to separate the amylose.

Gel formation, or set-back, is not simply an increase in viscosity; a gel of this type is different in kind from the most viscous liquids. A starch gel has many properties that are comparable to those of a solid. It is often rigid and may have a definite shape. Its rigidity or "gel strength" is measured by a determination of the force necessary to rupture the gel under certain conditions, a measurement that is said to involve the elastic limit. This peculiar characteristic of starch solutions or starch pastes has been attributed to the formation of an interlaced network of randomly oriented linear molecules. The formation of such a gel takes place progressively over a period of time so that on cooling rapidly only a fraction of a solution or paste may have congealed. Then the remainder congeals over a period of time until the entire mass is rigid. During the congealing, the process referred to as retrogradation takes place and small particles form that are usually submicroscopic and at most are of the order of five microns. These particles do not grow in the gel structure nor can they be separated from the gel structure in which they are embedded.

In carrying out the method of this invention, the starch solution is so altered that it does not set back or form a gel on cooling, and, in the same steps, the growth of the amylose-rich precipitate is enhanced making the separation easier.

To return to the process steps, when the process is begun with a dry starch, the starch is first mixed with water by any suitable means to suspend it. This may be simply a tank with an agitator to assure that the starch is thoroughly suspended and is uniformly dispersed when used. The mixture of starch and water is then heated above about 250° F.

The starch suspension is desirably brought to temperature rapidly and we prefer to use the type of apparatus disclosed in application Serial No. 790,487, filed February 13, 1959, for O. R. Etheridge. In this apparatus, steam at superatmospheric pressure is continuously mixed with the starch suspension in the throat of a steam jet. In this way, the suspension is brought to the desired temperature virtually instantaneously and the starch is cooked to a fluid solution within a few seconds. In the apparatus of the patent application referred to, the steam-heated suspension flows downward into and through a detention zone where the hot suspension is maintained at an elevated temperature for a period of time that is selectable. This apparatus is so arranged and constructed that there is substantially no mixing in the detention zone in order that the starch solution withdrawn from the bottom of the detention zone be maintained at a uniform temperature for a uniform length of time. Other forms of this type of apparatus may also be used for heating, for example, of the types disclosed in U.S. Patent Numbers 2,871,146; 2,582,198; and 2,805,966 (Etheridge).

Other methods may be used in heating the starch-and-water mixture. As described below, we have heated a starch-water mixture in an autoclave and have pumped such a mixture through a heat exchanger which comprised a coil of tubing in a constant-temperature environment, and similar results are obtained by heating in this manner.

It is desirable to agitate the starch suspension when bringing it up to temperature in order to assure uniform heating and rapid heat transfer. This is readily accomplished in the steam-jet type of apparatus already described.

The final temperature above 250° F. to which the solution is heated and the time at temperature both have an influence on the results obtained. Within limits, relatively high temperatures and long times appear to have an advantageous effect on the viscosity and stability of the solution after cooling, and on the ease of separation. Nevertheless, the higher the temperature or the longer the time at temperature, the greater is the tendency for the starch to become degraded, i.e., to be of lower molecular weight. At the minimum, the starch solution must be kept above 250° F. until all the starch is acted upon uniformly. Then as the temperature is increased or the time above 250° F. is increased, the other should be decreased. As a compromise between ease of separation and solution stability on one hand and molecular weight of the fractions on the other, temperatures in the range of 250° F. to 350° F. can be used when the suspension is heated to temperature in less than five minutes and held at temperature for up to about 30 minutes additional. Optimum results have been obtained by heating the starch and water to a temperature of 280 to 320 substantially instantaneously in a continuous manner and holding at temperature for 0.5 to 15 minutes. Temperatures in excess of about 350° F. should be avoided because at this point degradation is too rapid, but this temperature limit will vary 10 or 20° F. depending on the variety of starch.

In the first stage of cooling from above about 250° F., the solution may be cooled at any suitable rate to the atmospheric boiling point. It is preferably cooled rapidly to the atmospheric boiling point as by flashing the solution to atmospheric pressure when the Etheridge apparatus is used, or by quenching. While slow cooling to the atmospheric boiling point is possible, as by permitting the temperature of the solution and the apparatus containing it to decrease without forced cooling, this is preferably avoided to avoid degrading or hydrolyzing the starch. Rapid cooling to the boiling point of the solution produces amylose of higher molecular weight and this is preferred.

The second part of the cooling cycle is critical. In order to stabilize the solution and to form and grow amylose particles, we have discovered, the solution must be kept for a period between 120° F. and the atmospheric boiling point. Preferably it is cooled slowly between those temperatures.

The two principal classes of starches—the root or tuber and the cereal—react quite differently in this phase of the process. The root starches, exemplified by tapioca and potato starch, do not congeal as readily as the cereal starches. The latter, exemplified by corn, rice and wheat starch, are prone to set back and to do so rapidly. In using potato or tapioca starch in this process, we have found that there is little congealing even though the solution is cooled rapidly from its boiling point to room temperature, for example, in 1.5 hours. In contrast corn, rice or wheat starch, if cooled at the same rate (or even somewhat more slowly) to the same temperature, will invariably congeal making the separation impossible. Although the root-starch solutions do not congeal when they are cooled rapidly, the amylose particles do not grow to a size that permits separation and the particles in rapidly cooled root-starch solutions do not exceed about five microns in diameter on an average. However, if the root-starch solutions are cooled according to this invention in the manner required to prevent congealing with the cereal starches, the time necessary for root-starch amylose particles to grow to a separable size is about the same as the time necessary to grow cereal-starch amylose particles.

We have discovered that a cereal starch cannot be cooled from the atmospheric boiling point to below about 120° F. in less than eight hours if congealing is to be prevented. Under these minimum conditions, the amylose-rich particles form and grow to some extent. However, it is preferable to use a longer period to increase the particle size further. For effiuent separation the amylose particles should be permitted to grow until at least 50% by weight are in excess of 20 microns in diameter; this will occur in the minimum time specified when corn starch is used and the solution is cooled slowly to 120° F. It is to be noted that, after the slow cooling to 120° F., particles continue to form (if not completely percipitated before) and to grow even though cooled below 120° F.

We have found that the solution may be rapidly cooled from the boiling point to any temperature at or above about 120° F. and held there for the time necessary to stabilize the solution and form and grow the amylose particles. However, for reasons that are not known, the rate at which this occurs when at a constant temperature is much slower than the rate when the solution is cooled slowly through the range and, moreover, the particles tend to be smaller and more diffifficult to separate.

There is considerable variation with holding temperature in the time necessary to stabilize a solution when cooled rapidly to a temperature of at least about 120° F. and held there: the time is less when the temperature is higher, and at 120° F. the time required may exceed 48 hours for corn starch. On the other hand, a large proportion of the amylose particles do not seem to grow as rapidly at the higher temperatures as they do at the lower and there is a much greater danger of hydrolyzing the starch when the temperature is kept high. For these several reasons, we prefer to cool the solution slowly through the range between the atmospheric boiling point and the critical temperature of about 120° F., taking at least eight hours. After the solution has been stabilized by continual slow cooling (or by rapid cooling followed by maintaining it at a constant temperature), it may be cooled further as desired.

The amylose particle size obtained in the same period of time with this method is not the same for all varieties of starch. For reasons that are not now known, the particle size varies with the starch variety when the same conditions are used. Often, in order to obtain the desired particle size of 50% by weight above 20 microns more than the minimum eight hours is required. With corn starch, we readily obtain a particle size distribution such that the average diameter is in the range of 25-30 microns with less than 20% by weight under 20 microns. Under optimum conditions corn amylose particles of the order of 70 to 80 microns in diameter and larger have been obtained. In contrast, the average particle diameter of granular corn starch is about 10 microns.

During the cooling period, agitation of the solution should be kept to a minimum since agitation may lead to the formation of a rigid gel or to the production of small, difficulty separable particles or both. The solution may be seeded with amylose after the temperature has been reduced below the boiling point, for example, by adding it to an aqueous suspension of amylose.

During the heating the concentration of the starch in water may be as high as can be advantageously handled in the equipment used. The concentration should not be less than about 2.5% by weight starch dry substance for economical operation. During the cooling period between the atmospheric boiling point and about 120° F., the concentration is more critical. The concentration of the solution in this step of the process has an important influence on particle growth and on the stability of the solution. We have found that, after the solution is cooled to the atmospheric boiling point, the solution viscosity, which in this process is determined to a considerable extent by the solids content for any particular variety of starch, should be kept below about 1500 centipoises. The solids content is stated in terms of viscosity because the viscosity of such starch solutions varies not only with the solids content but also with the variety of starch, with its previous treatment, with the rate of heating and the final temperature and so on. The viscosity affects particle growth since the rate of particle growth is at least partly controlled by diffusion, and diffusion of a high molecular weight compound in a viscous medium will ordinarily be slow. We have observed, for example, that during this step of the process, the practical upper limit for the commercial grade of native corn starch is about 15% solids by weight dry substance. It is possible, however, to perform the heating step at high concentration and, after cooling below the atmospheric boiling point, to dilute the solution with water to keep the viscosity below 1500 centipoises.

Since the solution viscosity during cooling affects the rate of growth of the amylose particles, it is desirable to keep the viscosity as low as possible. However, the additional water required to maintain a low viscosity must later be removed from both the amylose and amylopectin fractions, and drying the ampylopectin fraction is a relatively expensive operation. On balance, the optimum range of solids is from about 7% to about 13% starch dry substance by weight. We do not exclude small amounts of substances in the starch solutions that are inactive in the process, but no active ingredients other than starch and water are necessary to the process. For example, a small amount of preservative may be added, such as 0.05 gram of phenyl mercuric acetate per liter.

The solid, amylose-rich phase may be separated in any suitable manner. For example, a high-speed centrifuge may be used of the type employed in corn starch wet-milling to separate the granular starch from the gluten. The apparatus used in the separation will, of course, depend on particle size and the viscosity of the liquor, among other factors. When sufficient particle growth has been obtained, a gravity separator may be used, for example, operation in the nature of a Dorr thickener. After separation, the wet amylose cake is washed. This may be performed by slurrying the cake in a relatively small amount of water and separating the solids from the wash water by centrifuging. The final cake is then dried, for example, by spray drying, roll drying, vacuum drying or other methods of removing water rapidly. Our observation is that when the wet amylose was dried slowly in air, it became hard and horny and relatively difficult to grind. However, relatively slow air drying may be used when the character of the dried amylose particles is of little importance. The amylopectin fraction may be dried by the same methods, or it may be used without drying, for example, in the manufacture of syrup.

We have found that satisfactory separations of the solid fraction at room temperature (about 30° C. or 86° F.) are achieved at viscosities in the range of 400 to 600 centipoises, although such separations by high-speed centrifuge can be performed at 1500 centipoises. However, viscosity decreases with increasing temperature, and, because the viscosity characteristics of the solution have been stabilized, in accordance with our invention, it is possible to facilitate the separation of the solid fraction by centrifuging the solution while hot.

The viscosity measurements which are referred to herein are measured on a Brookfield viscometer using a spindle speed of 20 r.p.m. A Number 1 spindle is used for viscosities up to 500 centipoises and a Number 2 spindle is used for viscosities over 500 centipoises. This instrument is described in the Kerr volume cited above at page 127.

We have described the solution, heated and cooled according to this invention, as "stable." A very simple test has been devised to characterize the solution produced to determine whether it is stable and whether the amylose can be separated from it. A sample of the solution is cooled rapidly with stirring in an ice bath to 86° F. or to any convenient temperature near room temperature. The viscosity is then measured immediately with the Brookfield viscometer as described. The solution is kept at a constant temperature and the viscosity measurement is repeated periodically over a period of at least five hours. If the solution is stable there will be substantially no increase in the viscosity measurement. If it is not stable, the viscosity measurement will increase suddenly and sharply and continue to increase. If the solution is unstable, there will be at least a 25% increase in viscosity in five hours and usually there is such an increase within two hours. If, according to this test, the solution is unstable, it will not be possible to separate the amylose fraction with satisfactory purity and yield. For cereal starches, this simple test determines the minimum time for which the solution must be kept between about 120° F. and the boiling point. For root starches, where solution stability is not so great a problem, it is better to determine the minimum time by the extent to which the particles grow. For effective separation, the particle growth should be enough so that at least 50% by weight is greater than 20 microns.

The separated amylose may be cast from solution as a film useful in packaging, particularly foodstuffs (e.g., as sausage casings) since the amylose is digestible by humans. The structure of amylose resembles cellulose and similarly, many of its derivatives are thermo-plastic. Accordingly, amylose and its derivatives (for example, the acetates) are useful in the manufacture of fibers and molded products of the nature of cellulosic products. The amylopectin fraction is useful in the same manner as the starch derived from the waxy maize variety of corn. Amylopectin is used in the manufacture of adhesives; in textile printing and finishing; in thickening and stabilizing pie fillings, salad dressings and canned food.

The results obtained with the present process are all the more striking when the starch is derived from ordinary corn. Of all the varieties of starch, corn starch is especially prone to set back on cooling after it is heated in water to a temperature at or above its pasting temperature. By keeping a solution of corn starch in water, according to this invention, above about 120° F. for at least eight hours, the set-back is avoided. This is of particular advantage, for corn is a major source of starch.

FIGURE 1 illustrates the method of this invention. In FIGURE 1 reference numeral 10 indicates an open mixing tank having an agitator 12 in which water and granular starch are mixed to form a suspension. The tank is of a common variety with a conical base having an outlet conduit 14 at the apex of the cone and an outlet valve 15 to control the flow rate. Conduit 14 is connected to the intake of a pump 16 which discharges through the slurry feed conduit 18. Conduit 18 is connected to a slurry-heating device of the type described in the Etheridge application, referred to before, which is indicated generally by reference numeral 20.

The high-temperature starch-slurry-heating device 20 comprises a steam jet 22 mounted on a pressure vessel 26, referred to as a hold tank. The steam jet 22 is connected to a steam manifold 24 and to the pump discharge conduit 18. In the jet, the starch slurry enters axially under pressure while the steam enters the throat of the jet from a peripheral nozzle thereby thoroughly and rapidly heating the starch slurry to a temperature that is readily controlled by the steam pressure and the rates of flow. The steam jet 22 discharges directly into the hold tank 26 as described in the Etheridge application. The hold tank is provided with a vent 28 having a pressure controller 30 to regulate pressure in the hold tank. Additional steam may be added to the void space above the liquid in the hold tank to make up for heat losses. At the base of the hold tank 26 there is a discharge conduit 32 for the starch paste and the conduit 32 has a valve 33 to control the residence time in the hold tank. The discharge conduit 32 is connected to a precipitation vessel 34 which may be simply a tank at atmospheric pressure. The precipitation vessel has a jacket 36 through which heating or cooling fluids may be circulated by means of conduits 38 and 40 in order to regulate the rate of cooling of the starch solution.

The vessel 34 has a discharge conduit 42 at the bottom which is connected to the inlet port of a centrifuge 44. A pump may be included in the conduit 42 or the apparatus may be arranged for gravity flow. The centrifuge produces an aqueous solution rich in amylopectin and a wet solids cake rich in amylose. The amylopectin solution is flowed through conduit 46 to a spray drier 48 to produce a dry product enriched in amylopectin. This drier is of the type in which the liquor is sprayed into a rising stream of hot air so that as the spray falls it is dried, but other types may be used as is common in the starch industry. To reduce the load on the drier, the amylopectin solution should be concentrated in a conventional evaporator, before drying.

The wet centrifuge cake is transported to a washing operation. The apparatus for washing comprises a simple mix tank 52 having an agitator 54 and a water inlet 56. Tank 52 is shown in the drawing as being connected by a conduit 50 to the centrifuge 44. However, the method of transporting the wet solids cake to the washing operation will depend upon the liquid content of the solids. It may be desirable in some instances to wash the solids out of the centrifuge or to operate the centrifuge so that a pumpable solids phase is produced. In any event, the solids phase is mixed with water in tank 52 and thereafter partially dewatered in a second centrifuge 60. The mix tank 51 is connected through conduit 58 to the feed port of the second centrifuge.

Centrifuge 60 is connected by means of conduit 62 to the mix tank 10 to permit recyling of the wash water to prevent losses of fine amylose particles or of amylopectin in the wash water. The wet solids cake from centrifuge 60 is then dried, the centrifuge being connected to the drier 66 through a conduit 64. Again, any suitable method may be used for conveying the centrifuge cake to the drier. The drier may be a spray drier or alternatively may comprise a series of tanks and filters followed by a suitable drier in which the amylose is dewatered and dried by treatment with methanol (or other organic solvent) to replace the water as described hereinafter. In the latter case, the organic solvent will be removed by conventional and simpler drying methods. The organic solvent can be recovered for further use by methods well known in the art.

The following examples illustrate the method of this invention, but it should be borne in mind that these examples are illustrative only and are not intended as a limitation of the invention. In the examples, only commercial grades of starch are used.

In the examples, references are made to the "blue value" of the fractions separated. The "blue value" is an analytical determination that permits distinguishing between amylose and amylopectin. Amylose has a high blue value and, we are informed, corn amylose of commerical value has a blue value upwards of 0.7. Values as high as 1.34 have been reported for the high-molecular-weight potato amylose. Defatted corn starch is reported to have a blue value of about 0.37. Amylopectin has a blue value of 0.20 or less. Generally, the blue value of amylose depends on its molecular weight and the value decreases as the molecular weight decreases, although not necessarily in direct proportion. For corn starch and its fractions, the blue value is increased about 10 or 15% upon defatting. The blue values set forth in this application were determined in the following manner: A sample of 0.1 gram (weighted to the nearest 0.1 milligram) is transferred to a 100-milliliter volumetric flask. The sample is mixed with 1 milliliter of ethanol, 10 milliliters of water and 2 milliliters of 10% sodium hydroxide. The sample is then heated until clear, cooled, and additional water added to make the 100-milliliter volume. Five milliliters of this solution is transferred to a 500-milliliter flask to which 100 milliliters of water is added following by three drops of 6 N hydrochloric acid. These are mixed by shaking, and then five milliliters of iodine solution (0.2% iodine and 2% potassium iodide) is added and the whole made to the 500-milliliter volume. The optical density of this solution at 680 m$\mu$ is read by means of a Beckman spectrophotometer using a 2-centimeter cell against a blank made in the same way without carbohydrate. The blue value is then the measured optical density multiplied by 0.2 and divided by the sample weight. As an alternative to the ethanol-sodium hydroxide mixture, the sample may be dissolved in 5 milliliters of 1 N sodium hydroxide without heating.

Because the blue value varies with both the molecular weight of the amylose and the amylose content and is also affected by the fatty acid content of the starch, in some cases determinations were made of the intrinsic viscosity of the separated fractions as a measure of the molecular weight. These measurements were made at 95° F. using 1 N potassium hydroxide as the solvent. An outline of this determination is found on page 675 of the Kerr volume referred to before. For a particular solvent-polymer system, the intrinsic viscosity decreases as the molecular weight decreases.

EXAMPLE 1

A suspension of granular native corn starch in water having a density of 5.6° Bé. and a pH of 6.5 was converted to a fluid solution by heating in an apparatus of the type described in the Etheridge application referred to before. The sample was retained in the hold tank for 6 minutes. The steam pressure in the jet mixer was 77 pounds per square inch gage (p.s.i.g.) and the starch suspension was introduced to the jet mixer at about 95 pounds p.s.i.g. In the hold tank the steam pressure was maintained at 56 pounds p.s.i.g. while the actual measured temperature in the tank was 297° F.

The starch solution, when first removed from the hold tank, had the appearance of a clear solution. Upon removal to atmospheric pressure, the temperature of the sample dropped to below the boiling point of water (in the neighborhood of 208° F.). The viscosity was measured on a Brookfield viscometer and, at 208° F., the value was 102 centipoises while a second sample run at 206° F. had a viscosity of 105 centipoises. The pH of the paste was 6.7.

The sample was divided into three fractions for cooling at different rates. The rates are graphically displayed in FIGURE 2. To obtain the different cooling rates the fractions of the sample were permitted to cool in three containers, each insulated differently from the others. The containers were, respectively, a stainless-steel beaker without insulation, a household picnic jug insulated with a fibrous form of insulation, and a Dewar flask.

The cooling rates obtained by heat loss to the ambient air are designated 1, 2, and 3, respectively, in FIGURE 2. It will be noted that the solution cooled according to rate 1 dropped below 120° F. in a little over four hours. With rates 2 and 3, this temperature was reached in 11 and 32 hours, respectively. It was observed that the solution cooled according to the first cooling curve had formed a rigid gel, while the other two samples, cooled in accordance with curves 2 and 3, remained stable. In each case, a solid, particulate phase had separated from the solution, and the separated solid was removed from the solution by centrifuging it at 9000 R. C. F. The rigid gel (produced in the stainless steel beaker) had to be comminuted in water by means of a high-speed mixer before solid could be recovered. The solid from each sample was dispersed in water with vigorous agitation, centrifuged again and this washing cycle repeated.

The washed solid phase was dehydrated by stirring in methanol and then washing twice in methanol and twice in acetone. Finally, the dewatered solid was thoroughly dried by heating at 110° C. The product was a white power. The blue values were determined, and the results are given in Table 1. Despite exhaustive washing, the solid separated from the rigid gel (cooling rate 1 contained a large amount of amylopectin, and this we have found is always true.

Table 1

| Cooling Rate | Amylose Fraction, Blue Value | Amylopectin Fraction, Blue Value |
|---|---|---|
| 2 | [1] 1.000 | [2] 0.122 |
| 3 | 0.896 | 0.320 |

[1] Intrinsic viscosity—1.45.
[2] Intrinsic viscosity—1.47.

EXAMPLE 2

The procedure of Example 1 was repeated except that the solution was maintained at 299° F. for 12 minutes in the hold tank. Again, the solution cooled in accordance with curve 1 of FIGURE 2 formed a rigid gel while the others remained stable. The results obtained are shown in Table 2. The viscosity of the solution was 80 centipoises at 208° F., a repeat sample gave a value of 90 centipoises at 206° F. The pH of the solution was 6.7.

Table 2

| Cooling Rate | Amylose Fraction, Blue Value | Amylopectin Fraction, Blue Value |
|---|---|---|
| 2 | [1] 1.020 | [2] 0.140 |
| 3 | 0.944 | 0.314 |

[1] Intrinsic viscosity—1.46.
[2] Intrinsic viscosity—1.48.

EXAMPLE 3

The procedure of Example 1 was repeated with a holding time of nine minutes. The solution had a Brookfield viscosity of 88 centipoises at 206° F. and a pH of 7.0. It was cooled in accordance with curve No. 2 of FIGURE 2 and the solid phase was separated from the still-fluid solution after standing overnight. The blue value of the amylose-rich solid phase was 1.040 while the blue value of the amylopectin-rich phase was 0.208.

EXAMPLE 4

The procedure of Example 2 was repeated in all essential details and the solution produced had a viscosity of 74 centipoises at 208° F. and a pH of 6.8. The solution was divided into three parts which were cooled overnight in accordance with curves 1, 2 and 3 of FIGURE 2; the final temperatures reached were 86° F., 102° F., and 142° F., respectively. The solid fractions were removed by centrifuging, as described. The blue values obtained are indicated in Table 3. The solution cooled in accordance with curve 1 had formed a rigid gel similar to that in Examples 1 and 2; the others were stable.

Table 3

| Cooling Rate | Amylose Fraction, Blue Value | Amylopectin Fraction, Blue Value |
|---|---|---|
| 2 | 1.043 | 0.208 |
| 3 | 0.999 | 0.344 |

In Examples 1, 2 and 4, samples for the analyses were removed from the Dewar flasks at an early stage when the temperature had fallen only to around 140° F. However, if cooled further to 120° F., as we prefer to do, the results are about the same as or slightly better than when cooled according to rate 2.

EXAMPLE 5

The procedure of Example 3 was repeated in all essential details except that the native corn starch was replaced with native starch derived from other sources. The cooling rates were in accordance with curve 2 of FIGURE 2. The results obtained are displayed in Table 4. The yield, it should be noted, is based on the weight of starch employed rather than on the amylose content of the native starch. In each case the final solution was stable.

Table 4

| Starch | Solution Viscosity, Centipoises at About 206° F. | Percent Yield Amylose Fraction | Blue Value of Amylose Fraction | Blue Value of Amylopectin Fraction |
|---|---|---|---|---|
| potato | 157 | 18.5 | 1.38 | 0.111 |
| tapioca | 87 | 16.3 | 1.38 | 0.026 |
| sago | 82 | 27.7 | 1.13 | 0.056 |
| rice | 103 | 20.8 | 1.13 | 0.117 |
| wheat | 119 | [1] 32.2 | 1.05 | |
| arrowroot | 162 | 17.2 | 1.20 | |

[1] This is substantially higher than the reported amylose content of wheat starch; nevertheless the blue value indicates that the amylose fraction is of high purity.

EXAMPLE 6

A 3:1 mixture of native granular corn and potato starch was heated in water as described in Example 1 and held at temperature for 8.5 minutes. The slurry feed had a pH of 6.0. After cooling according to curve 2 of FIGURE 2, the solution was stable, and 21.8 grams of amylose were separated per hundred grams of starch. The amylose had a blue value above 1.1. Similar results were obtained with 1:1, 7:1 and 1:9 mixtures of corn and potato starch.

EXAMPLE 7

In the apparatus of FIGURE 1, using essentially the same conditions as in Example 1, but with a 10-minute holding time, 839 pounds of native corn starch solution was produced at 9.4% solids. The solution was cooled from 212° F. to 86° F. in 40 hours and remained stable. Then the solid phase was separated by centrifuging at 86° F. using a Sharples supercentrifuge having a four-inch diameter bowl rotating at 15,000 r.p.m. The centrifuge cake was washed by slurry with 2 pounds of water per pounds of wet cake and re-centrifuged. The centrifuge cake contained 16.6% solids. The wash water was not re-circulated so that there was some loss of small particles. The yield was about 17% of the raw starch or roughly 70% of the estimated amylose content of the raw starch. The amylopectin fraction was recovered from solution by spray drying.

While all of the foregoing examples have included heating by means of a steam jet, the heating step may be performed otherwise. The following examples illustrate the results obtained when the heating step is performed in other types of equipment.

EXAMPLE 8

A slurry of granular native corn starch, about 9.5% solids, was pumped at room temperature at a constant rate through a coil of tubing immersed in a constant temperature bath maintained at about 300° F. The pumping rate was chosen to keep the starch and water in the bath for two minutes. The solution formed under these conditions was discharged at atmospheric pressure to an insulated container designed to furnish a cooling rate somewhat slower than that of curve 2 of FIGURE 2. After the solution had cooled below 120° F., it was stable and 27.7 grams of amylose with a blue value of 0.96 were recovered per hundred grams of starch feed. This procedure was repeated gradually increasing the temperature. Above about 350° F., the degradation of the starch was so rapid that the reduced specific viscosity of the starch, a measure of molecular weight of the starch, was reduced almost 60%.

EXAMPLE 9

This example illustrates the use of an autoclave in the method of this invention. Two hundred grams of corn starch was suspended in two liters of water. The mixture was heated for 45 minutes with stirring using a steam bath and an immersion heater. The temperature was about 205° F., although there was some surface boiling on the immersion heater.

About 1.5 liters of the clear starch paste that was formed was poured into an autoclave and the autoclave was sealed and heated electrically. After about half an hour the temperature had risen to about 306° F.; the autoclave was then permitted to cool. After about another 65 minutes, when the temperature had fallen to about the atmospheric boiling point, the autoclave was opened. A portion of the starch solution was poured into a loosely stoppered Dewar flask to cool. The solution reached room temperature after about two days and remained stable. The solution was examined microscopically, and it was observed that there were large amylose-rich particles present. A substantial fraction of these amylose particles were about 50–75 microns in diameter. The amylose-rich material was easily separated by centrifuging from the amylopectin-rich liquid phase.

Another portion of the autoclaved solution was cooled in an uninsulated beaker and in 24 hours it had set to a very rigid opaque gel. Some particles were observed in the rigid gel, but these were about five microns in diameter, i.e., considerably smaller than the average size of corn starch granules. This is typical of the particles formed when a starch paste retrogrades.

EXAMPLE 10

Following the procedure of Example 7, a large volume of solution was produced and the separation of the amylose fraction was carefully followed during the cooling from the boiling point. The cooling rate was such that about 36 hours was consumed in reaching 120° F. Small samples were removed while the solution was being cooled. Each sample was centrifuged under the same conditions and the volume of the solid cake was measured in proportion to the volume of liquid. About one-third of the amylose-rich solids had precipitated in the first ten hours (at about 156° F.). Then on approaching 120° F. there was a sudden and large increase in the amylose-rich solid phase until more than 25% of the starch solids had precipitated as amylose.

EXAMPLE 11

A batch of solution of corn starch was prepared essentially as described in Example 1 and divided into seven parts. Six parts, in covered containers, were immediately placed in separate constant temperature ovens maintained at 158° F., 140° F., 131° F., 121° F., 117° F., and 100° F. The other part was permitted to cool naturally to room temperature. After overnight standing, the 117°, 100° and room-temperature samples were congealed. The 158° sample, after overnight standing, and all the other samples within the next 48 hours, contained amylose particles that were readily separated by centrifuging. The congealed samples did not contain amylose particles of separable size.

In the foregoing description and in the appended claims the temperatures referred to are approximate. Many of the phenomena we have observed do not take place at sharply defined temperatures. Furthermore, such phenomena as the initiation and completion of the separation of the solid fraction are difficult to observe.

Since many embodiments may be made of this invention and since many changes may be made in the embodiments described, the foregoing description is to be interpreted as illustrative only, and the invention is defined in the appended claims.

We claim:

1. The method of fractionating starch that comprises forming a fluid solution consisting essentially of starch in water by heating it above about 250° F., the temperature and time of heating being limited to avoid substantial degradation of the starch, cooling said solution below the atmospheric boiling point and above about 120° F., the concentration of the starch dry substance in said cooled solution being more than about 2.5% by weight, maintaining said solution within the temperature range between about 120° F. and the atmospheric boiling point for a period to stabilize said solution and to form and grow a separable amylose-rich solid fraction therein and separating said fraction from the stable solution.

2. The method of fractionating starch that comprises forming a fluid solution consisting essentially of starch in water by heating it above about 250° F., the temperature and time of heating being limited to avoid substantial degradation of the starch, cooling said solution below the atmospheric boiling point and above 120° F., the concentration of the starch dry substance in said cooled solution being more than about 2.5% by weight, maintaining said solution within the temperature range between about 120° F. and the atmospheric boiling point for more than eight hours to stabilize said solution and to form and grow a separable amylose-rich solid fraction therein and separating said fraction from the stable solution.

3. The method of fractionating starch that comprises forming a fluid solution consisting essentially of starch in water by heating it above about 250° F., the temperature and time of heating being limited to avoid substantial degradation of the starch, cooling said solution below the atmospheric boiling point and above about 120° F., the concentration of the starch dry substance in said cooled solution being more than about 2.5% by weight and less than that required to impart a viscosity of more than 1500 centipoises to said cooled solution, maintaining said cooled solution within the temperature range between about 120° F. and the atmospheric boiling point for more than eight hours to stabilize it and to form and grow a separable amylose-rich solid fraction therein and separating said fraction from the stable solution 4. The method of fractionating starch that comprises forming a fluid solution consisting essentially of starch in water by heating it between 250 and 350° F., for a time limited to avoid substantial degradation of the starch, first cooling said solution to about the atmospheric boiling point and then slowly from about the atmospheric boiling point at a rate to reach 120° F. in more than eight hours, the solution being above 120° F. for a period sufficient to stabilize it and to form and grow a separable amylose-rich solid fraction therein, the concentration of the starch dry substance during said slow cooling being more than about 2.5% by weight and less than that required to impart to said solution a viscosity of more than 1500 centipoises, and separating said fraction from the stable solution.

5. The method of claim 4 in which the temperature of heating lies in the range of 280 to 320° F.

6. The method of separating amylopectin from starch that comprises forming a fluid solution consisting essentially of starch in water by heating it between 250 and 350° F. for a time limited to avoid substantial degradation of the starch, cooling said solution below its atmospheric boiling point and above about 120° F., the concentration of the starch dry substance in said cooled solution being more than about 2.5% weight and less than that required to impart to said solution a viscosity of more than 1500 centipoises, maintaining said cooled solution within the temperature range between about 120° F. and the atmospheric boiling point for a period of more than eight hours to stabilize it and to produce and grow a separable amylopectin-deficient solid fraction therein, separately collecting the liquid fraction of said stabilized solution and removing water from it to produce an amylopectin-rich solid fraction.

7. The method of fractionating starch that comprises forming a fluid solution consisting essentially of starch in water by heating it between 250 and 350° F. for up to about 30 minutes, first cooling said solution to about its atmospheric boiling point and then slowly from its atmospheric boiling point at a rate to reach 120° F. in more than eight hours, the solution being between 120° F. and the atmospheric boiling point for a period sufficient to stabilize it and to form and grow a separable amylose-rich solid fraction therein, the concentration of the starch dry substance during said slow cooling being more than about 2.5% by weight and less than that required to impart to said solution a viscosity of more than 1500 centipoises, and separating said fraction from the stable solution.

8. The method of fractionating starch that comprises forming a fluid solution consisting essentially of starch in water by heating with steam at superatmospheric pressure to raise its temperature substantially instantaneously to 250 to 350° F. for up to about 30 minutes, first cooling said solution below its atmospheric boiling point and then slowly from about the atmospheric boiling point at a rate to reach 120° F. in more than eight hours, the solution being between about 120° F. and the atmospheric boiling point for a period sufficient to stabilize it and to form and grow a separable amylose-rich solid fraction therein, the concentration of starch dry substance during said slow cooling being more than about 2.5% by weight and less than that required to impart to said solution a viscosity greater than 1500 centipoises, and separating said fraction from the stable solution.

9. The method of fractionating a cereal starch that comprises forming a fluid solution consisting essentially of said cereal starch in water by heating it between 250 and 350° F. for a time limited to avoid substantial degradation of the starch, cooling said solution below its atmospheric boiling point and above about 120° F., the concentration of the starch dry substance in said cooled solution being more than about 2.5% by weight and less than that required to impart to said solution a viscosity of more than 1500 centipoises, maintaining said solution between 120° F. and the atmospheric boiling point for more than eight hours to stabilize it and to form and grow a separable amylose-rich solid fraction therein and separating said fraction from the stable solution.

10. The method of fractionating a cereal starch that comprises forming a fluid solution consisting essentially of said cereal starch in water by heating it with steam at superatmospheric pressure to bring the temperature rapidly to between 250 and 350° F. and maintaining the temperature between 250 and 350° F. for up to about 30 minutes, first cooling said solution to about the atmospheric boiling point and then slowly from about the atmospheric boiling point at a rate to reach 120° F. in more than eight hours, the solution being above about 120° F. for a period sufficient to stabilize it and to form and grow an amylose-rich solid fraction, the concentration of starch dry substance during said slow cooling being more than 2.5% by weight and less than sufficient to impart to said solution a viscosity of more than 1500 centipoises, and separating said fraction from the stable solution after at least 50% by weight of the particles therein are larger than 20 microns.

11. Amylose separated from substantially unmodified starch according to the method of claim 1.

12. Amylose separated from substantially unmodified starch according to the method of claim 8.

13. Amylose separated from substantially unmodified starch according to the method of claim 9.

14. Amylopectin separated from substantially unmodified starch according to the method of claim 6.

References Cited in the file of this patent

UNITED STATES PATENTS

| | | |
|---|---|---|
| 2,633,436 | Martin | Mar. 31, 1953 |
| 2,871,146 | Etheridge | Feb. 24, 1954 |

OTHER REFERENCES

Kerr, R. W.: Chemistry and Industry of Starch, 2nd Ed., 1940, Academic Press Inc. N.Y., N.Y., pp. 167–168, 182–183.

Chem. Abstracts, vol. 43, page 2455f.

UNITED STATES PATENT OFFICE
CERTIFICATE OF CORRECTION

Patent No. 3,067,067             December 4, 1962

Oliver R. Etheridge et al.

It is hereby certified that error appears in the above numbered patent requiring correction and that the said Letters Patent should read as corrected below.

Column 1, line 44, for "Advance" read -- Advances --; column 2, line 8, for "require" read -- required --; line 56, for "be" read -- by --; column 9, line 29, for "51" read -- 52 --; line 32, for "recyling" read -- recycling --; line 75, for "following" read -- followed --; column 10, line 75, for "power" read -- powder --; column 11, footnote 2 of Table 1, for "1.4.7" read -- 1.47 --; line 66, for "anlyses" read -- analyses --; column 14, line 18, after "above" insert -- about --; line 40, after "solution" insert a period.

Signed and sealed this 21st day of May 1963.

(SEAL)
Attest:

ERNEST W. SWIDER
Attesting Officer

DAVID L. LADD
Commissioner of Patents